US006448343B1

(12) United States Patent
Schombourg et al.

(10) Patent No.: US 6,448,343 B1
(45) Date of Patent: Sep. 10, 2002

(54) SILANE VULCANIZED THERMOPLASTIC ELASTOMERS

(75) Inventors: Jacques F. Schombourg, Commugny; Peter Kraxner, Geneva; Willy Furrer, Gingins; Abdellatif Adberrazig, Meyrin, all of (CH)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 09/504,285

(22) Filed: Feb. 15, 2000

Related U.S. Application Data (63) Continuation of application No. PCT/US99/14019, filed on Jun. 22, 1999, and a continuation-in-part of application No. 09/102,492, filed on Jun. 22, 1998, now abandoned.

(51) Int. Cl.[7] .................. C08F 275/00; C08G 63/48; C08G 63/91; C08L 39/04; C08L 51/00
(52) U.S. Cl. .................. 525/288; 525/73; 525/74; 525/78
(58) Field of Search ................ 525/288, 73, 74, 525/78

(56) References Cited

U.S. PATENT DOCUMENTS

| 4,146,529 A | * | 3/1979 | Yamamoto et al. |
| 4,764,546 A | | 8/1988 | Mitsuno et al. |

FOREIGN PATENT DOCUMENTS

| DE | 4402943 | 3/1995 |
| EP | 0158764 | 10/1985 |
| EP | 0262233 | 4/1988 |
| EP | 0695320 | 10/1994 |
| EP | 0733675 | 9/1996 |
| WO | 9108257 | 6/1991 |

* cited by examiner

Primary Examiner—Patrick D. Niland
(74) Attorney, Agent, or Firm—Michael P. Dilworth; Paul Grandinetti

(57) ABSTRACT

The formation of thermoplastic vulcanates may be accomplished with two polymers, wherein one polymer is grafted, or copolymerized with a carboxylic acid anhydride, which acid anhydride grafted polymer then is reacted with an amino silane, which reacts with the acid anhydride and then cross links.

32 Claims, 5 Drawing Sheets

Gel content of compounds

Gel content of compounds

FIG. 1

Maximum torque observed during compounding

SILANE VULCANIZED THERMOPLASTIC ELASTOMERS

This application is a continuation of copending application PCT/US99/14019 filed Jun. 22, 1999, designating the US, and is a continuation-in-part of application Ser. No. 09/102,492, filed Jun. 22, 1998, now abandoned.

BACKGROUND OF THE INVENTION

Thermoplastic elastomers (TPB) exhibit the functional properties of conventional thermoset rubbers, yet they can be melted repeatedly and are therefore suitable for processing in conventional thermoplastic fabrication equipment. The majority of TPE consist of two phases, one consisting of a rubber material (elastomer) that is insoluble in the other, and a flowable thermoplastic material. The rubber material is present as a dispersed phase and the thermoplastic is the continuous phase.

Although it is in principle not necessary to crosslink the rubber in a TPE, it has proven efficient using crosslinking techniques to obtain better chemical resistance, mechanical properties and a better control of phase separation. Such TPE compositions where a crosslinking reaction and process is used to achieve phase separation into divided domains are called Thermoplastic Vulcanizates (TPV). To keep their thermoplastic character, it is essential that only the rubber phase be crosslinked. For an extensive and detailed description and review of TPV technology, see for instance S. Abdou-Sabet, R. C. Puydak and C. P. Rader in *Rubber Chemistry and Technology*, vol.69, pp 476–493, 1996.

Furthermore, it has been demonstrated that the mechanical performance of TPVs improves with the degree of crosslinking of the rubbery phase and with the inverse of the particle size of rubbery domains. Dynamic crosslinking (which consists of intimately mixing a blend of compatible polymers, then introducing a crosslinking system in the mixture while the mixing process is continued) is used to generate the finely dispersed, highly crosslinked rubbery phase from a homogeneous blend of polymers.

For thermodynamic and hydrodynamic reasons it is preferred that the polymer viscosity be increased while crosslinking is taking place, because the particles tend to agglomerate while the phases are separating. Moreover, if a phase-inversion process can take place while crosslinking, this is favorable to the formation of fibrous rubber domains which may provide specific mechanical properties. However, it has been found preferable to select a crosslinking mechanism that can involve in part the thermoplastic phase, not to the point where the thermoplastic character of the TPV is removed, but only to achieve better adhesion and compatibility of the polymers.

The selection of a crosslinking process and chemicals is governed by processing requirements, e.g., reaction rate at the processing temperature; compatibility with the elastomer; side reactions with the thermoplastic; efficiency (number of crosslinks generated by each molecule of crosslinker); absence of undesired reactions; toxicity and hazards; color; and odor.

One example of such TPVs is EPDM/PP described in U.S. Pat. No. 3,130,535. EPDM and PP are mixed intimately in an internal mixer, and a peroxide is added to crosslink the EPDM. Excess peroxide and/or excessively high processing temperature and/or excessively reactive polymers will cause degradation of the PP phase and/or scorch. In contrast, insufficient amount of peroxide and/or too low processing temperature and/or a poorly reactive EPDM will cause insufficient crosslinking.

One deficiency of polyolefin-based TPV's is that they cannot be painted without a preliminary surface treatment. It was disclosed in U.S. Pat. No. 4,311,628 that other crosslinking agents can be used, e.g., dimethylol octyl phenol resin and sulfur. Superior mechanical properties could be achieved, but unfortunately both systems suffer from excessive odor and/or yellowing of the resulting materials, as well as the difficult control of sulfur cure reactions.

It was disclosed in European Patent 0 324 434 to use silane-grafted polymers in the thermoplastic phase. After mixing, the material is shaped and left to react with atmospheric moisture. Thus it was possible to obtain a more elastomeric material after water cure. However the obtained water-cured item no longer contains a thermoplastic elastomer and cannot be recycled. To overcome this limitation, European Patent 0 409 542 disclosed mixing an EPR (ethylene-propylene rubber) or EPDM with a crystalline ethylene-propylene thermoplastic, an organofunctional silane and a free radical generator. The silane is grafted to the resin by the free radical generator and crosslinking takes place through reaction of the silane with water.

A refinement of the above processes is disclosed in European Patent 0 510 559 where the EPR or EPDM first is grafted, then mixed to the thermoplastic PP and to a crosslinking additive comprising water. The same process is disclosed using very low or ultra low density polyethylene (VLDPE or ULDPE) to reduce raw materials costs and lower mixing temperatures. See DE 44 02 943. It is also suggested to add simultaneously the PP component and the PE component together with silane and radical generator as a dry compound, the addition of water and condensation catalyst being made in a subsequent stage. However, the addition of water into an extruder at temperatures well above its boiling point is a difficult process. Moreover, the amount of water needed is so low that its metering requires sophisticated instrumentation in contradiction with the aim of the patent.

U.S Pat. No. 4,146,529 to Yamamoto et al. discloses reacting an acid modified polypropylene with an amino or epoxy silane, but the purpose of such reaction is to use the alkoxy groups to bind to fillers and to react the non-grafted carboxylic anhydride to form low odour, non-volatile products, not to crosslink the alkoxy functionalities amongst themselves. The intent of these compositions is to couple mineral fillers and not to form thermoplastic vulcanizates; or, in the absence of filler, to favor reaction of the amino or epoxy of the silane with free, volatile, non-grafted acid or anhydride.

German Patent DE 196 29 429 teaches (amongst other issues) the use of pre-blends of vinyl silanes, amino silane and unsaturated carboxylic anhydrides which are used for crosslinking of polyolefins respectively.

SUMMARY OF THE INVENTION

The present invention teaches the manufacture of TPV's using polymers, carboxylic acid anhydride and an amino silane.

DETAILED DESCRIPTION OF THE INVENTION

The objectives of the present invention are to prepare new TPV's with a wide range of properties, low cost TPV's, paintable TPV's, to allow for the preparation of TPV's in conventional mixers without the need for expensive additional equipment, to avoid the use of high amounts of crosslinking agents (e.g., metal organics or peroxides) in the preparation of TPV's, and to obtain stable TPV compositions.

Composition

The TPVs are a blend of
(a) a first polymer (rubber phase);
(b) a crystalline or partly crystalline thermoplastic polymer (thermoplastic phase);
(c) a carboxylic acid anhydride, incorporated as a comonomer in component (a) or grafted onto component (a); and
d) an aminosilane; which is allowed to crosslink.

A. Polymers

Suitable polyolefin rubber phase components (a) are any polymer which can be reacted such as to yield an carboxylic anhydride containing polymer like, e.g., ethylene propylene copolymer (EPR); ethylene propylene diene terpolymer (EPDM), butyl rubber (BR); natural rubber (NR); chlorinated polythylenes (CPE); silicone rubber; isoprene rubber (IR); butadiene rubber (BR); styrene-butadiene rubber (SBR); ethylene-vinyl acetate (EVA); ethylene butylacrylate (EBA), ethylene methacrylate (EMA), ethylene ethylacrylate (EEA), ethylene-α-olefin copolymers (e.g., EXACT and ENGAGE, LLDPE (linear low density polyethylene)), high density polyethylene (HPE) and nitrile rubber (NBR). Polypropylene is not suitable as this phase since it has a tendency to degrade during crosslinking; however, if the polypropylene is a copolymer or graftomer of polypropylene with an acid anhydride, then it may be used. Preferably, the polymer is an ethylene polymer or copolymer with at least 50% ethylene content (by monomer), more preferably at least 70% of the monomers are ethylene.

Suitable thermoplastic polymers (b) are polypropylene (PP); polyethylene, especially high density (PE); polystyrene (PS); acrylonitrile butadiene styrene (ABS); styrene acrylonitrile (SAN); polymethylmethacrylate (PMMA); thermoplastic polyesters (PET, PBT); polycarbonate (PC); and polyamide (PA).

Such polymers may be made by any process known in the art, including, but not limited to, by bulk phase, slurry phase, gas phase, solvent phase, interfacial, polymerization (radical, ionic, metal initiated (e.g., metallocene, Ziegler-Natta)), polycondensation, polyaddition or combinations of these methodologies.

It is possible to have the polymers for the two phases be the same wherein the acid anhydride is pre-added to one part of the polymer, which pre-reacted polymer will act as the rubber phase within the TPV. Such pre-addition includes the possibilities of having the acid anhydride present as a comonomer in the polymer or pre-reacting the acid anhydride with the polymer. In either of these two cases, the addition of the separate acid anhydride would not be necessary since it is present in the polymer. Given this level of complexity, it is preferred that the two polymers be different from each other.

A third alternative is that the polymer of the rubber phase and the thermoplastic phase may the same polymer, but the acid anhydride is added to the polymer as a whole. In such a case when the silane is added part of the polymer would form the rubber phase, while another part would not react (given the relatively small amount of anhydride and silane present). It is important that a proper degree of phase separation is between the rubber and thermoplastic phases created during the process. This process would not necessarily lead to a TPV because one may not necessarily achieve the necessary phase without adding significantly to process complexity, and thus is not preferred.

In the case of two different polymers, the polymer that is more reactive with the acid anhydride will be grafted by the acid anhydride and will act as the rubber phase in the TPV.

The polymer which is to become the rubber phase must be extrudable and should be capable of grafting with the acid anhydride.

The melting point of the thermoplastic phase should be less than the decomposition temperature of the aminosilane, as well as the decomposition temperature of the acid anhydride (unless the acid anhydride is a comonomer in the polymer).

The polymers may have unimodal, bimodal or multimodal molecular weight distributions. The melt flow of the polymers may be any of those known in the art for use in forming thermoplastics and rubbers.

B. Carboxylic Acid Anhydrides

Any carboxylic acid anhydrides which can be grafted onto the polymer to be the rubber phase by any possible mechanism may be used. It is preferable, that there be an unsaturation either in the polymer, or more preferably, in the acid anhydride, to accomplish this drafting. The unsaturation of the carboxylic acid anhydride may be internal or external to a ring structure, if present, so long as it allows for reaction with the polymer. The acid anhydride may include halides. Mixtures of different carboxylic acid anhydrides may be used. Exemplary unsaturated carboxylic acid anhydrides to use are isobutenylsuccinic, (+/−)-2-octen-1-ylsuccinic, itaconic, 2-dodecen-1-ylsuccinic, cis-1,2,3,6-tetrahydrophthalic, cis-5-norbornene-endo-2,3-dicarboxylic, endo-bicyclo[2.2.2]oct-5-ene-2,3-dicarboxylic, methyl-5-norbornene-2,3-carboxylic, exo-3,6-epoxy-1,2,3,6-tetrahydrophthalic, maleic, citraconic, 2,3 dimethylmaleic, 1-cyclopentene-1,2-dicarboxylic, 3,4,5,6-tetrahydrophthalic, bromomaleic, and dichloromaleic anhydrides.

These acid anhydrides may be present as a comonomer in the polymer of the rubber phase or be grafted onto the polymer which will be the rubber phase.

The amount of acid anhydride to use is 0.01 to 1.0 wt % based on the total amount of polymer present.

C. Amino Silanes

The amino silanes for use herein have at least one hydrolyzable Group, e.g., alkoxy, acetoxy or halo, preferably alkoxy. Preferably, there are at least two such hydrolyzable groups capable of undergoing crosslinking condensation reaction so that the resulting compound is capable of undergoing such crosslinking. A mixture of different amino silanes may be used.

The amine must have a sufficient rate of reaction with the acid anhydride. Generally, tertiary amines do not react appropriately with the acid anhydride and should be avoided. The amino group may be bridged to the silicon atom by a branched group to reduce yellowing of the resulting composition.

The silane may be represented by the formula YNHBSi$(OR)_a(X)_{3-a}$, wherein a=1 to 3, preferably 3, Y is hydrogen, an alkyl, alkenyl, hydroxy alkyl, alkaryl, alkylsilyl, alkylamine, C(=O)OR or C(=O)NR, R is an acyl, alkyl, aryl or alkaryl, X may be R or halo. B is a divalent bridging group, which preferably is alkylene, which may be branched (e.g. neohexylene) or cyclic. B may contain heteroatom bridges e.g., an ether bond. Preferably B is propylene.

Preferable R is methyl or ethyl. Methoxy containing silanes may ensure a better crosslinking performance than ethoxy groups. Preferably, Y is an amino alkyl, hydrogen, or alkyl. More preferably, Y is hydrogen or a primary amino alkyl (e.g., aminoethyl). Preferable X are Cl and methyl, more preferably methyl. Examplary silanes are γ-amino propyl trimethoxy silane (SILQUEST® A1110 silane from Witco Corp., Greenwich, Conn. USA); γ-amino propyl triethoxy silane (SILQUEST A-1100); γ-amino propyl methyl diethoxy silane; 4-amino-3,3-dimethyl butyl triethoxy silane, 4-amino-3,3-dimethyl butyl methylediethoxysliane, N-β-(aminoethyl)-γ-aminopropyltrimethoxysilane (SILQUEST A-1120), $H_2NCH_2CH_2NHCH_2CH_2NH(CH_2)_3Si(OCH_3)_3$ (SILQUEST A-1130) and N-β-(aminoethyl)-γ-aminopropylmethyldimethoxysilane (SILQUEST A-2120). Other suitable amino silanes are as follows: 3-(N-allylamino)propyltrimethoxysilane, 4-aminobutyltriethoxysilane, 4-aininobutyltrimethoxysilane, (aminoethylaminomethyl)phenethyltrimethoxysilane, aminophenyltrimethoxysilane, 3-(1-aminopropoxy)-3,3,dimethlyl-1-propenyltrimethoxysilane, bis[(3-trimethoxysilyl)propyl]ethylenediamine, N-methylaminopropyltrimethoxysilane, bis-(γ-triethoxysilylpropyl)amine (SILQUEST A-1170), and N-phenyl-γ-aminopropyltrimethoxysilane (SILQUEST Y-9669).

If the amino silane is a latent aminosilane, i.e., a ureidosilane or a carbamatosilane, then the blending temperature must be sufficient so that the respective blocking group comes off from the amine and allows the amine to react with the acid anhydride functionality, about 150 to 230° C. Examples of such latent aminosilanes are tert-butyl-N-(3-trimethoxysilylpropyl)carbamate, ureidopropyltriethoxysilane, and ureidopropyltrimethoxysilane. Other carbamato silanes which may be used are disclosed in U.S. Pat. No. 5,220,047, which is incorporated herein by reference. Preferably, so as to avoid the additional complexity of deblocking, the amino silane is not such a latent amino silane.

The amino silane should be present at 250 to 25,000 ppm based on weight of both polymers. It should also be present at a molar equivalency ratio to the acid anhydride of about 0.1 to 10, more preferably 0.9 to 1.1, most preferably, about a 1:1 ratio.

The silane may be carried on a carrier such as a porous polymer, silica, titanium dioxide or carbon black so that it is easy to add to the polymer during the mixing process. Exemplary such material are ACCUREL polyolefin (Akzo Nobel), STAMYPOR polyolefin (DSM) and VALTEC polyolefin (Montell), SPHERILENE polyolefin (Montell), AEROSIL silica (Degussa), MICRO-CEL E (Manville) and ENSACO 350G carbon bulack (MMM Carbon).

E. Optional Additives

A free radical generator would be required if the carboxylic acid anhydride is being grafted by a free radical mechanism onto the polymer, but it is not required if the acid anhydride is either grafted via another mechanism or being a comonomer of the polymer. Suitable free-radical catalysts may be selected from the group of water soluble or oil soluble peroxides, such as hydrogen peroxide, ammonium persulfate, potassium persulfate, various organic peroxy catalysts, such as dialkyl peroxides, e.g., diisopropyl peroxide, dilauryl peroxide, di-t-butyl peroxide, di(2-t-butylperoxyisopropyl)benzene, 3,3,5-trimethyl 1,1-di(tert-butyl peroxy)cylohexane; 2,5-dimethyl-2,5-di(t-butylperoxy)hexane, 2,5-dimethyl-2,5-di(t-butylperoxy)hexyne-3; dicumyl peroxide, alkyl hydrogen peroxides such as t-butyl hydrogen peroxide, t-amyl hydrogen peroxide, cumyl hydrogen peroxide, diacyl peroxides, for instance acetyl peroxide, lauroyl peroxide, benzoyl peroxide, peroxy ester such as ethyl peroxybenzoate, and the azo compounds such as 2-azobis(isobutyronitrile).

The free radical generator may be present at 1/100 to 1/1 based on the molar quantity of the acid anhydride.

Standard additives such as stabilizers (UV, light or aging), antioxidants, metal deactivators, processing aids, waxes, fillers (silica, $TiO_2$, $CaCO_3$, $Mg(OH)_2$, carbon black, etc.), and colorants may be added to the TPVs. Additionally, blowing agents may be added to the polymers so that when they are extruded the polymer will form a foam. Examples of such blowing agents are volatile hydrocarbons, hydrofluorocarbons, and chlorofluorocarbons. Commonly know foaming agent like azocarbonamide or sodium bicarbonate (aka sodium hydrogen carbonate) decompose at elevated temperature to yield gaseous products. These are all chemical foaming processes. Foams can also be produced by injection of liquid or gaseous foaming agent into the polymer melt. Examples are, e.g., butane, $CO_2$, nitrogen, water, helium, etc. The amount of such a blowing agent should be at 0.1 to 50 weight percent of the polymers.

Process

In a first reaction the carboxylic acid anhydride is grafted (most preferably by a free radical mechanism) onto the rubber phase polymer. Said reaction may be done with both polymers present or with the two polymers separated, though it is preferred to accomplish this with both polymers present. As stated before, alternatively, this step may be effectively accomplished by the inclusion of the carboxylic acid anhydride as a comonomer in the rubber phase polymer (in which case, no free radical generator is necessary). The polymer should be grafted/copolymerized with carboxylic acid anhydride prior to the reaction with aminosilane, since the reaction product between acid anhydride and amino silane has only a poor grafting efficiency. A prior reaction between aminosilane and acid anhydride would result in the formation of a semiamide, which could have inferior grafting properties. In this case, no crosslinking would occur. In contrast, partial degradation of the polymer and/or the plasticizing effect of the semiamide may lead to a rise in melt flow index (MFI).

It is preferable to add free radical generator with the anhydride during the grafting step to induce the grafting of the acid anhydride onto the rubber phase polymer.

If the second, thermoplastic polymer is not present during the grafting, then it should be blended in with the grafted rubber phase polymer prior to the addition of the aminosilane; however, such method suffers deficiency in terms of the mechanical properties of the resulting TPV.

The second step is the addition of the amino silane to the rubber phase grafted polymer/thermoplastic polymer blend. No water and/or catalyst need be added. This is a very fast reaction between amino silane and the grafted acid anhydride. The reaction of a grafted acid anhydride moiety with γ-aminopropylsilane may be viewed as:

The reaction between the silane and the grafted acid anhydride moiety has to be fast to obtain a crosslinkable material and faster than the reaction between the alkoxy groups and the acid anhydride. A retarded reaction could occur concurrently with the crosslinking of the alkoxy moieties, which could prevent crosslinking. The reaction between amino group and anhydride is very fast when using, e.g., primary amino groups. The reaction may be slowed down by employing secondary amino groups. Moreover, this step should be one at an elevated temperature. e.g., from 50 to 200° C. depending on the polymer blend. Preferably, the polymer blend is in a melt stage when the amino silane is added to the polymer.

After the amino silane is grafted onto the one polymer, it should be allowed to crosslink, so as to form the gel phase of the crosslinked polymer. No separate moisture cure needs to take place. A condensation catalyst may be used to expedite the crosslinking process, though the semi-amide should be a sufficient catalyst. One to ten minutes at an elevated temperature of 60 to 200° C. should ensure such crosslinking occurs.

It has to be noted that the total amount of additives is only 0.4% of the total composition, about five times less than the amount needed for peroxide or vinyl silane cure. This benefits in two ways, a reduction in total cost and a reduction of fugitive peroxides, which can present safety issues.

During and after crosslinking, all of the ingredients should be blended in an internal mixer. The mixer may be an extruder (single screw, twin screw, etc.), a BUSS KO-KNEADFR mixer or a simple internal type mixer. The conditions for mixing depend on the polymers and degree of crosslinking.

Properties

The resulting product is a thermoplastic vulcanisate with excellent mechanical properties. The crosslinked materials have a significant gel content and a much lower MFI than the starting polymers, which should improve the creep resistance, provide higher tensile strength at break and provide materials that are harder than non-crosslinked polymer-blends. The end product has elastic properties (i.e., elongation at break of greater than 400%), but can be melt processed with methods normally known in the art for thermoplastics. The preferred gel content of the final product (i.e., rubber content) is between 10 to 50 wt %, most preferably 25–35 wt %. The tensile and flexible moduli in the machine and transverse directions are improved, as is the dart impact strength of the material.

The TPVs are paintable and have better oil resistance. The TPVs may be used in, e.g., adhesives and sealants, cable insulations, pipes, profiles, moulded parts, foamed parts, sheets etc.

The aminosilane rubber phase modified polymer will tend to be more compatible with the thermoplastic polymer, providing for a stronger TPV.

EXAMPLES

All silanes used are set forth above, except for SILQUEST A-186 (γ-(3,4-epoxycyclohexyl) ethyltrimethoxysilane), SILQUEST A-187 (γ-glycidoxypropyltrimethoxysilane) and SILQUEST A-189 (γ-mercaptopropyltrimethoxysilane). Compounding equipment: Brabender Head 50 $cm^3$ having Banbury knives. Compounding parameters: Brabender Head at 190° C./RPM 120. All precents are weight percents unless otherwise specified.

Process I

Total amount of ingredients of formulation: 55 g All ingredients were fed into the Brabender Head with the exception of homopolymer polypropylene VALTEC HL003 (+5% Silane). After 5 min (Brabender torque value was noted) the VALTEC HL003 (+5% Silane) was added into the Brabender Head. Time and value of the maximum Brabender torque was noted as an indicator for crosslinking. After the Brabender torque had dropped back to the initial level and homogenization of the compound is achieved (ca. 10 min), the compound was recovered from the Brabender. A specimen, 1.5 mm thickness, was molded in a press at 210° C./20 bars.

Process II

Same procedure as Process I but all ingredients were fed into the Brabender head at the same time. Compounding time 15 min. A specimen, 1.5 mm thickness, was molded in a press at 210° C./100 bars for 200 s.

Examples 1–3 are given to show that a wide range of properties can be obtained, depending on the polymer grades. The weight percents given for material carried on another material are based on the weight of the carrier and carried material.

Example 1

Composition

75% ENGAGE 8452 Ultra low density polyethylene (from Dupont Dow Elastomers, Melt Index (190° C./2.16 kg): 3 g/10 min. Density: 0.875 g/cc). 17% VALTEC HL003 polypropylene homopolymer (SPHERIPOL® porous granules from Montell: Melt Index (230° C./2.16 kg): 0.7 g/10 min; Density: 0.900 g/cc), 1% VALTEC HL003 (+5% soaked INTEROX DHBP (2,5-Dimethyl 2,5-di(tert-butylperoxy)hexane from Peroxid-Chemie, Munchen)), 2% VALTEC HL003 (+5% soaked maleic anhydride), 5% VALTEC HL003 (+5% soaked A-1100), Process I. The maleic anhydride was absorbed into the polymer by melting the anhydride. (m.p 53° C.), blending it with the polymer and then cooling.

Example 2

Composition

75% NORDEL 2722 ethylene propylene diene monomer rubber (Dupont Dow Elastomers: Density: 0.88 /$cm^3$ Mooney Viscosity ML 1+4 at 121° C.: 28), 17% VALTEC HL003, 1% VALTEC HL003 (+5% soaked INTEROX DHBP), 2% VALTEC HL003 (+5% soaked maleic anhydride), 5% VALTEC HL003 (+5% soaked A-1100), Process I.

Example 3

Composition

75% ENGAGE D8842.00 ultra low density polyethylene (from Dupont Dow Elastomers: Melt Index (190° C./2.16 kg) (1.0 min): Density: 0.857 g/cc), 17% VALTEC HL003, 1% VALTEC HL003 (+5% soaked INTEROX DHBP), 2% VALTEC HL003 (+5% soaked maleic anhydride), 5% VALTEC HL003 (+5% soaked A-1100). Process I.

Examples 4–7 illustrate influence of process and ingredients

Example 4 (Comp.)

Composition

75% ENGAGE 8452, 25% VALTEC HL003. Process II.

Example 5 (Comp.)

Composition

75% ENGAGE 8452, 22% VALTEC HL003, 1% VALTEC HL003 (+5% soaked INTEROX DHBP), 2% VALTEC HL003 (+5% soaked maleic anhydride), Process I.

Example 6 (Comp.)

Composition

75% ENGAGE 8452, 17% VALTEC HL003, 1% VALTEC HL003 (+5% soaked INTEROX DHBP), 2% VALTEC HL003 (+5% soaked maleic anhydride), 5% VALTEC HL003 (+5% soaked A-1100), Process II.

Example 7 (Comp.)

Composition

75% ENGAGE 8452, 17% VALTEC HL003, 1% VALTEC HL003 (+5% soaked INTEROX DHBP), 2% VALTEC HL003 (+5% soaked maleic anhydride), 5% VALTEC HL003 (+5% soaked hexadecyl amine). Process I.

Examples 8–17 illustrate influence of silane type variation. Examples 15–17 are comparative. All silanes were added as a 5 weight-% masterbatch based on VALTEC HL003. Preparation of compounds was according to process I.

Physical Properties

The physical properties were measured according to the following norms:

| | |
|---|---|
| Elongation & Tensile at break | ISO 37 (50 mm/min) |
| MFI | ISO 1872-1, No. 18 T |
| SHORE A | ISO 868 |
| GEL CONTENT | ISO 6427 |
| Torque | torquemeter on Brabender |

Results

Variation of Silanes

Table 1 shows the properties of the materials obtained according to the procedures mentioned in the experimental part. The comparative examples (Comp. Ex.) consist of:

Ex. 4) the pure blend of ENGAGE 8452 (PE) and VALTEC HL003 (PP);
Ex. 5) blend of ENGAGE, VALTEC, peroxide and maleic anhydride;
Ex. 6) blend of ENGAGE, VALTEC, peroxide, maleic anhydride and A-1100, but everything mixed at once, and
Ex. 7) blend of ENGAGE, VALTEC, peroxide, maleic anhydride and hexadecyl amine.

Ex. 4 is to give the properties of the pure polymer blend, Ex. 5 to evaluate the influence of the silane alone, Ex. 6 to show the influence of the processing and Comp Ex. 7 to prove the necessity of having a silane in the mixture.

TABLE I

Properties of the compounds

| Example | Gel content [%] | Tensile at break [MPa] | Elongation [%] | MFI(190° C., 5 kg) [g/10 min] | Shore A | Torque [Nm] |
|---|---|---|---|---|---|---|
| Ex. 1 | 35 | 23 | 810 | 1.80 | 88.00 | 13 |
| Ex. 2 | 36 | 8 | 400 | 0.90 | 85.00 | 10 |
| Ex. 3 | 32 | 8 | 800 | 0.60 | 74.00 | 12 |
| Ex. 4 (Comp.) | 1 | 14.53 | 1005 | 6.00 | 83.00 | 5 |
| Ex. 5 (Comp.) | 2 | 16.13 | 909 | 7.71 | 84.50 | 4 |
| Ex. 6 (Comp.) | 1 | 15 | 750 | 7.50 | 83.00 | 5 |
| Ex. 7 (Comp.) | 0 | 20.94 | 922 | 6.75 | 87.10 | 4 |
| Ex. 8 (A-1100) | 30 | 18.13 | 739 | 0.46 | 88.00 | 12 |
| Ex. 9 (A-1110) | 32 | 20.00 | 762 | 0.20 | 87.30 | 14 |
| Ex. 10 (A-1120) | 31 | 16.51 | 756 | 0.65 | 88.00 | 13 |
| Ex. 11 (A-1130) | 30 | 19.30 | 840 | 0.70 | 87.40 | 13 |
| Ex. 12 (A-1170) | 20 | 19.04 | 932 | 0.62 | 87.10 | 7 |
| Ex. 13 (A-2120) | 27 | 17.88 | 810 | 0.65 | 86.30 | 13 |
| Ex. 14 (Y-9669) | 1 | 23.53 | 861 | 1.91 | 82.50 | 5 |
| Ex. 15 (A-186) | 3 | 23.03 | 895 | 4.68 | 84.30 | 4 |
| Ex. 16 (A-187) | 1 | 17.63 | 877 | 4.28 | 85.00 | 5 |
| Ex. 17 (A-189) | 2 | 20.17 | 934 | 4.40 | 84.50 | 5 |

Figure 1:
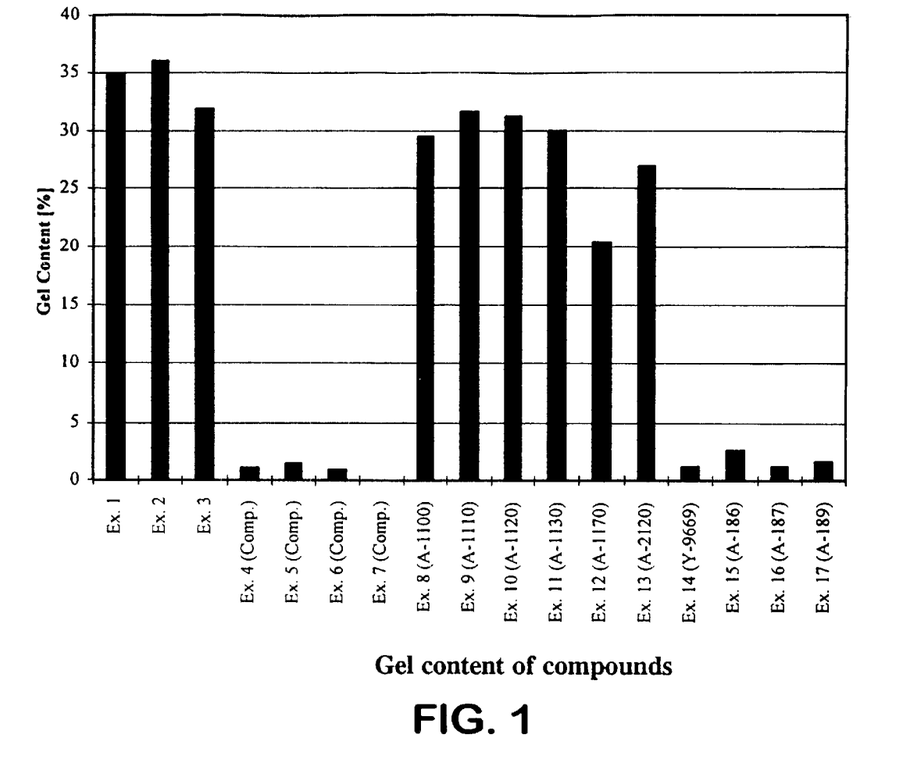
FIGS. 1–5 illustrate physical properties of TPVs made in the examples.
Figure 2:
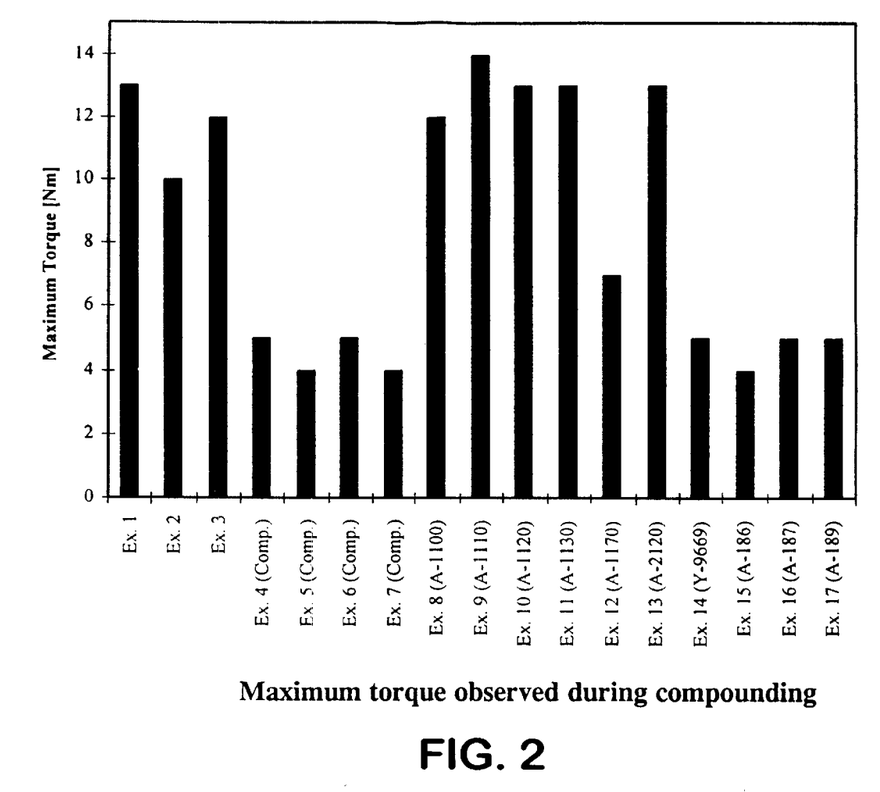

FIG. 1 displays the obtained gel contents for the different silanes, FIG. 2 shows the maximum torque observed during preparation of compounds. Data displayed in FIGS. 1 and 2 show that an increase in maximum torque observed during compounding is related to a crosslinking reaction. It is evident that all primary amines (SILQUEST A-1100, A-1110, A-1120, A-1130 and A-2120 silanes) induce a straight forward crosslinking, when being mixed into the polymer blend after grafting of the maleic anhydride.

Figure 3:
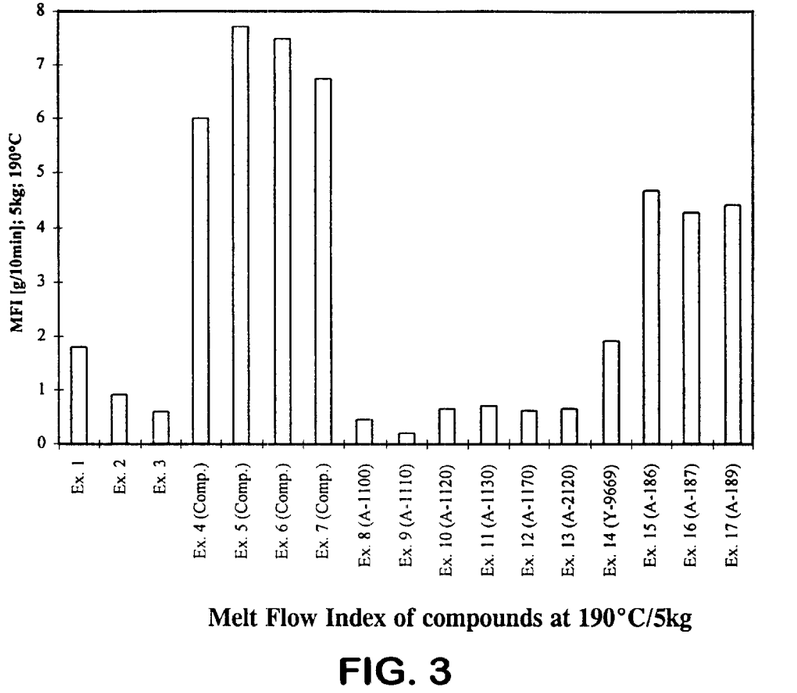
Figure 4:
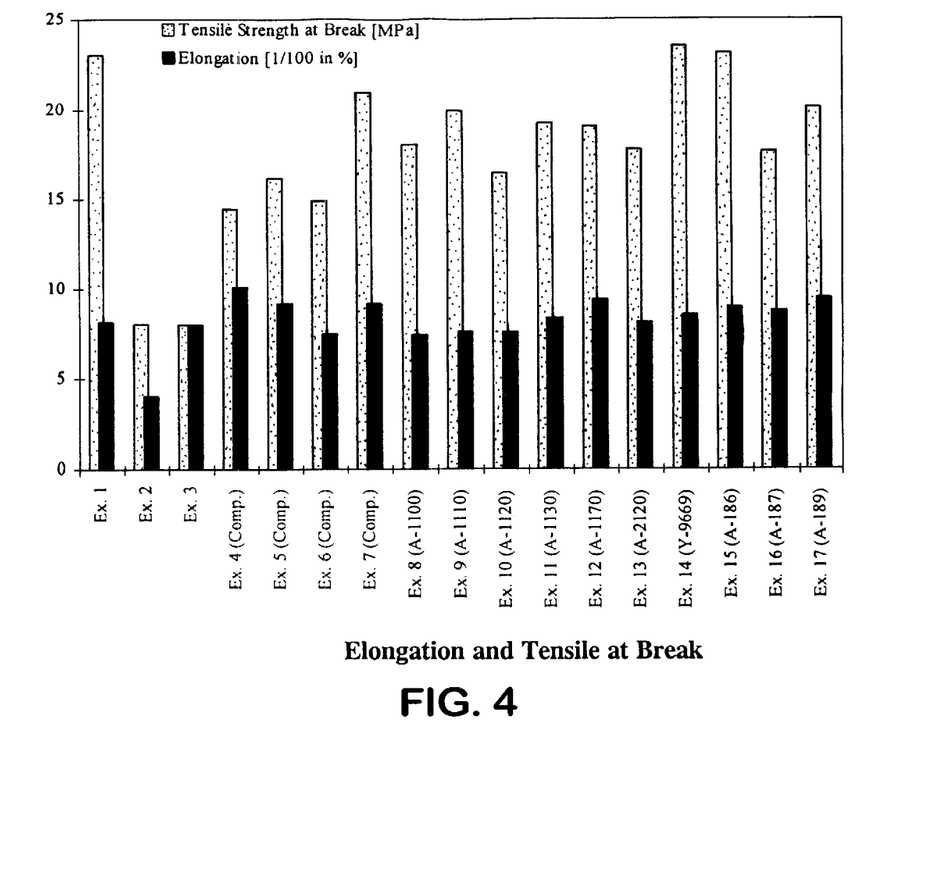
Figure 5:
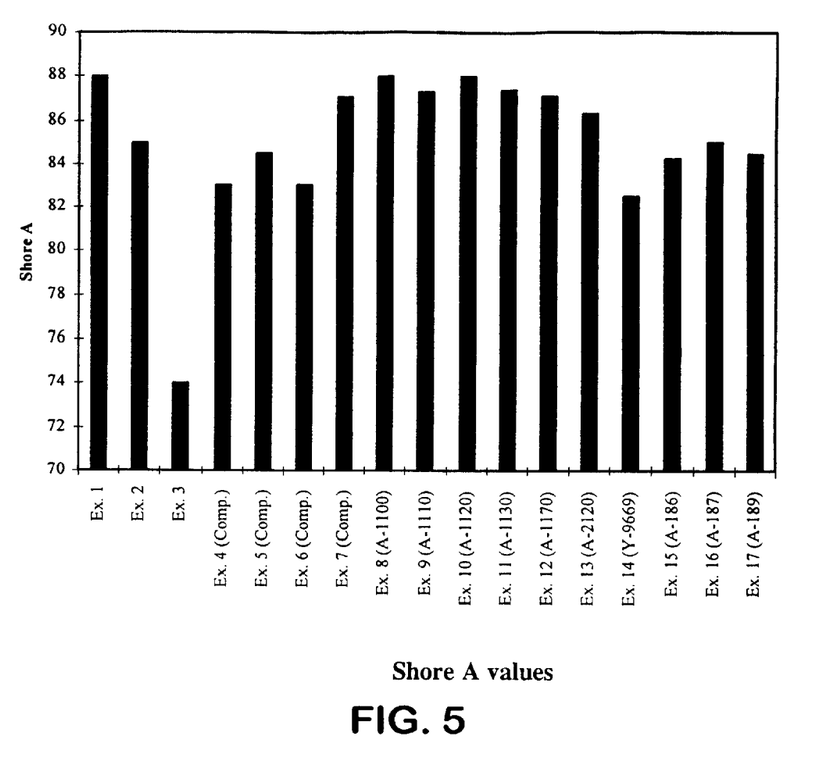

In contrary, mixing of all materials at the same time (Comp. Ex. 6) did not lead to any significant crosslinking. The slight differences in degree of crosslinking compared to A-1100 silane can be either due to different molar amounts, different number and/or kind of alkoxy group and number of amino functions per molecule. The material obtained using the secondary amino silane A-1170 shows also a relatively high degree of crosslinking, whereas Y-9669 (secondary amino silane) causes no significant crosslinking. It is noted that since the molecular weight of A-1170 is considerably higher than the other silanes used, and the experiments were run at equal silane weights, the molar amount of A-1170 is less than the other silanes and at equivalent molar amounts produces increased gel formation. The latter is also true both for the other silanes tested, as well as for the case where hexadecyl amine was employed instead of a silane The data presented in FIGS. 3–5 show for all cases where crosslinking was observed a significant change in the material properties against the pure blend of the two polymers. The melt flow index drops to about 1/10, in the case of A-1110 silane even to 1/30. The materials are also significantly harder, have a higher tensile strength at break and a lower elongation at break. The changes in properties are consistent with the relative high degree of crosslinking in these compounds.

With respect to the other silanes employed, the properties of the resulting materials cannot be imputed to a high degree of crosslinking. However, all silanes causes a decrease of the MFI, indicating that some chain extension has occurred. This is evident in comparing with all comparative examples and in particular with Comp. Exp. 5 (only peroxide and maleic anhydride), where even a certain degree of degradation had taken place. Note that a high MFI is measured also when A-1100 silane was mixed in at the same time as the other ingredients.

Exchanging the amino silane with hexadecyl amine (Comp. Ex. 7) leads also to a material with superior mechanical properties and higher hardness. The improvement of properties presumably is related to the attachment of long side chains to the polymer backbone ('comb polymers') since no crosslinking is possible. Thus, a TPV was not made (no gel content).

Examples 18–21—Variation of Aminosilanes

The TPV's were prepared according to the procedure described above. For all runs the amount of aminosilanes was kept the same (on a molar base). Silanes A and B are as follows:

| Formulation: | Ex. 18 (A-1100) parts | Ex. 19 (Silane A) parts | Ex. 20 (Silane B) parts | Ex. 21 (A-1170) parts |
|---|---|---|---|---|
| ENGAGE 8452 | 75 | 75 | 75 | 75 |
| VALTEC HL003 | 17 | 17 | 17 | 17 |
| VALTEC HL003 + 5% DHBP | 1 | 1 | 1 | 1 |
| VALTEC HL003 + 5% Maleic anhydride | 2 | 2 | 2 | 2 |
| VALTEC HL003 + 5% Silane | 5 | 5 | 4.64 | 7.72 |
| Gel content [%] | 26 | 25 | 8 | 23 |
| Optical appearance [Gardner scale] | 3 | 2 | 1 | 1–2 |
| Relative adhesion (applied hot) | Fair | Fair | Fair | Excellent |

Silanes A, B and A-1170 gave products, which are slightly less yellow than the one obtained using A-1100. A-1170 as crosslinker leads to materials with very much improved adhesive properties, when compared to the other sample.

Foam Application

Examples 22–25

The use of the TPV products for foam application was evaluated (Examples 22 and 23) and compared with formulations reacted only with peroxide and maleic anhydride only (Example 24) or peroxide (Example 25), respectively. The materials with exception of the blowing agent azodicarbonamide were reacted at 180° C. in the Brabender (details for the preparation of TPV's as above). After 10 min the formulation was cooled down to 160° C. and the blowing agent was added. In Example 23 the aminosilane was added after addition of the blowing agent. After further mixing for 3 minutes, test plaques were prepared at 170° C./100 bar/100 s. The plaques were foamed in an oven at 200° C. for 3 to 5 minutes. Formulation as given below:

| Formulation: | parts | Ex. 22 | Ex. 23 | Ex. 24 | Ex. 25 |
|---|---|---|---|---|---|
| 1) ENGAGE 8452 | 75 | X | X | X | X |
| 2) VALTEC HL003 | 17 | X | X | X | X |
| 3) VALTEC HL003 + 5% DHBP | 1 | X | X | X | X |
| 4) VALTEC HL003 + 5% MAH | 2 | X | X | X | |
| 5) VALTEC HL003 + 5% A-1100 | 5 | X | X | | |
| 6) Blowing agent GCS2 AC | 15 | X | X | X | X |
| Melt stability during foaming [1] | | Good | Good | Moderate | Bad |
| Gel content [%] ([2] = after foaming) | | 26 (33[2]) | 33 (31[2]) | 1 (1[2]) | 1 (1[2]) |

[1] Appearance of the foam structure

The melt strength is high enough to support the decomposition temperatures of azodicarbonamide (200° C. for several minutes). The shape remained within its original dimensions and does not stick on the support. In contrary, the non-crosslinked samples changed dimensions during foaming, thus leading to a worse cell structure and sticking to the support surface. The order of addition (silane before or after azodicarbonamide) seems not to influence significantly the appearance of the resulting foam or the amount of gel.

Examples 26–29

Single Polymer TPV's

The general procedure is the same as set forth above, however, in Examples 27–29, only one polymer was used, in Example 27 a polyethylene, in Example 28 HDPE LUPOLEN 5031L by Elenac: MFI (190° C., 2.16 kg)=6.5; Density: 0.952 and in Example 29, polypropylene.

| Experiment | 26 Parts | 27 Parts | 28 Parts | 29 Parts |
|---|---|---|---|---|
| Engage 8452 | 37.5 | 46 | 0 | 0 |
| LUPOLEN HDPE | 0 | 0 | 46 | 0 |
| Valtec HL003 | 8.5 | 0 | 0 | 46 |
| 5% DHBP on Valtec HL003 | 0.5 | 0.5 | 0.5 | 0.5 |
| 5% (MAH dissolved in MeOH) on Valtec HL003 | 1.5 | 1.5 | 1.5 | 1.5 |
| 5% A-1100 on Valtec HL003 | 2.5 | 2.5 | 2.5 | 2.5 |
| Gel content [%] | 24 | 19 | 20 | 0 |

The system grafted maleic anhydride/aminosilane can be used to crosslink pure ENGAGE resin as well as pure HDPE but did not lead to any gel when used in polypropylene.

What is claimed is:

1. A thermoplastic vulcanizate possessing a gel content of between 10 to 50 wt % and an elongation at break of greater than 400%, comprising:
   (a) a dispersed rubber phase comprising the crosslinked reaction product of
      (i) a first polymer selected from the group consisting of ethylene propylene copolymer, ethylene propylene diene terpolymer, butyl rubber, natural rubber, chlorinated polyethylene, silicone rubber, isoprene rubber, butadiene rubber, styrene-butadiene rubber, ethylene-vinyl acetate, ethylene butylacrylate, ethylene methacrylate, ethylene ethylacrylate, ethylene-α-olefin copolymers, linear low density polyethylene, ultra low density polyethylene, high density polyethylene and nitrile rubber;
      (ii) carboxylic acid anhydride; and
      (iii) an aminosilane; and
   (b) a continuous thermoplastic phase comprising a second polymer selected from the group consisting of polypropylene, polyethylene, high density polyethylene, polystyrene, acrylonitrile butadiene styrene, styrene acrylonitrile, polymethylmethacrylate, thermoplastic polyesters, polyethylene terephthalate, polybutylene terephthalate and polycarbonate.

2. The thermoplastic vulcanizate of claim 1 wherein the acid anhydride is grafted onto the first polymer in the presence of a free radical generator.

3. The thermoplastic vulcanizate of claim 1 wherein the acid anhydride is a comonomer in the first polymer.

4. The thermoplastic vulcanizate of claim 1 wherein the acid anhydride is selected from the group consisting of isobutenylsuccinic, (+/−)-2-octen-1-ylsuccinic, itaconic, 2-dodecen-1-ylsuccinic, cis-1,2,3,6-tetrahydrophthalic, cis-5-norbornene-endo-2,3-dicarboxylic, endo-bicyclo[2.2.2] oct-5-ene-2,3-dicarboxylic, methyl-5-norbornene-2,3-carboxylic, exo-3,6-epoxy-1,2,3,6-tetrahydrophthalic, maleic, citraconic, 2,3 dimethylmaleic, 1-cyclopentene-1,2-dicarboxylic, 3,4,5,6-tetrahydrophthalic, bromomaleic and dichloromaleic anhydrides.

5. The thermoplastic vulcanizate of claim 1 wherein the acid anhydride is maleic anhydride.

6. The thermoplastic vulcanizate of claim 1 wherein the aminosilane contains a primary amine.

7. The thermoplastic vulcanizate of claim 1 wherein the aminosilane is represented by the formula $YNHBSi(OR)_a(X)_{3-a}$, wherein a is 1 to 3, Y is hydrogen, or an alkyl, alkaryl, alkylsilyl or alkylamine group, R is an acyl, alkyl, aryl or alkaryl group, X is R or halo and B is a divalent bridging group, which may be linear, branched or cyclic.

8. The thermoplastic vulcanizate of claim 1 wherein the aminosilane is selected from the group consisting of gamma-amino propyl trimethoxy silane, gamma-amino propyl triethoxy silane, gamma-amino propyl methyl diethoxy silane, 4-amino-3,3-dimethyl butyl triethoxy silane, 4-amino-3,3-dimethyl butyl methyldiethoxysilane, N-beta-(aminoethyl)-gamma-aminopropyltrimethoxysilane, $H_2NCH_2CH_2NHCH_2CH_2NH(CH_2)_3Si(OCH_3)_3$, N-beta-(aminoethyl)-gamma-aminopropylmethyldimethoxysilane, N-(3-acryloxy-2-hydroxypropyl)-3-aminopropyltriethoxysilane, 3-(N-allylamino) propyltrimethoxysilane, 4-aminobutyltriethoxysilane, 4-aminobutyltrimethoxysilane, (aminoethylaminomethyl) phenethyltrimethoxysilane, aminophenyltrimethoxysilane, 3-(m-aminophenoxy)propyltrimethoxysilane, 3-(1-aminopropoxy)-3,3,dimethlyl-1-propenyltrimethoxysilane, bis[(3-trimethoxysilyl)propyl]ethylenediamine, N-methylaminopropyltrimethoxysilane, ureidopropyltriethoxysilane, ureidopropyltrimethoxysilane, bis-(gamma-triethoxysilylpropyl)amine and N-phenyl-gamma-aminopropyltrimethoxysilane.

9. The thermoplastic vulcanizate of claim 1 wherein the aminosilane is selected from the group consisting of gamma-amino propyl trimethoxy silane, gamma-amino propyl triethoxy silane, N-beta-(aminoethyl)-gamma-aminopropyltrimethoxysilane, bis-(gamma-triethoxysilylpropyl)amine and gamma-amino propyl methyl diethoxy silane.

10. The thermoplastic vulcanizate of claim 1 wherein the first polymer is the same as the second polymer.

11. The thermoplastic vulcanizate of claim 1 wherein:
   the first polymer is selected from the group consisting of ethylene propylene copolymer, ethylene propylene diene terpolymer, natural rubber, isoprene rubber, butadiene rubber, ethylene-vinyl acetate, ethylene-α-olefin copolymers, linear low density polyethylene, ultra low density polyethylene and high density polyethylene; and
   the second polymer is selected from the group consisting of polypropylene, polyethylene, high density polyethylene, thermoplastic polyesters, polyethylene terephthalate and polybutylene terephthalate.

12. The thermoplastic vulcanizate of claim 1 wherein:
   the first polymer is selected from the group consisting of ethylene-α-olefin copolymers, linear low density polyethylene, ultra low density polyethylene and high density polyethylene; and
   the second polymer is selected from the group consisting of polypropylene, polyethylene and high density polyethylene.

13. The thermoplastic vulcanizate of claim 1 wherein:
   the first polymer is selected from the group consisting of ethylene propylene copolymer, ethylene propylene diene terpolymer, natural rubber, isoprene rubber, butadiene rubber, ethylene-vinyl acetate, ethylene-α-olefin copolymers, linear low density polyethylene, ultra low density polyethylene and high density polyethylene;
   the second polymer is selected from the group consisting of polypropylene, polyethylene, high density polyethylene, thermoplastic polyesters, polyethylene terephthalate and polybutylene terephthalate;
   the acid anhydride is maleic anhydride; and
   the aminosilane is selected from the group consisting of gamma-amino propyl trimethoxy silane, gamma-amino propyl triethoxy silane, N-beta-(aminoethyl)-gamma-aminopropyltrimethoxysilane, bis-(gamma-triethoxysilylpropyl)amine and gamma-amino propyl methyl diethoxy silane.

14. A process of making a thermoplastic vulcanizate comprising:
   a. providing a blend comprising:
      (i) a first polymer having grafted thereto or copolymerized therein a carboxylic acid anhydride, wherein the first polymer is selected from the group consisting of ethylene propylene copolymer, ethylene propylene diene terpolymer, butyl rubber, natural rubber, chlorinated polyethylene, silicone rubber, isoprene rubber, butadiene rubber, styrene-butadiene rubber, ethylene-vinyl acetate, ethylene butylacrylate, ethylene methacrylate, ethylene ethylacrylate, ethylene-α-olefin copolymers, linear low density polyethylene, ultra low density polyethylene, high density polyethylene and nitrile rubber; and
      (ii) a second polymer selected from the group consisting of polypropylene, polyethylene, high density polyethylene, polystyrene, acrylonitrile butadiene styrene, styrene acrylonitrile, polymethylmethacrylate, thermoplastic polyesters, polyethylene terephthalate, polybutylene terephthalate and polycarbonate,
   b. reacting the blend of step (a) with an aminosilane; and
   c. crosslinking the product of step (b) to produce a thermoplastic vulcanizate possessing a crosslinked dispersed rubber phase comprising the first polymer and a continuous thermoplastic phase comprising the second polymer, a gel content of between 10 to 50 wt % and an elongation at break of greater than 400%.

15. The process of claim 14 wherein the first polymer is grafted with the carboxylic acid anhydride in the presence of a free radical generator.

16. The process of claim 14 wherein the acid anhydride is a comonomer in the first polymer.

17. The process of claim 14 wherein the first and second polymers are blended prior to the grafting of the carboxylic acid anhydride to the first polymer.

18. The process of claim 14 wherein the first and second polymers are blended subsequent to the grafting of the carboxylic acid anhydride to the first polymer.

19. The process of claim 14 wherein the first and second polymers are blended simultaneously to the grafting of the carboxylic acid anhydride to the first polymer.

20. The process of claim 14 wherein step (b) and step (c) are performed simultaneously.

21. The process of claim 14 wherein the aminosilane is carried on a carrier.

22. The process of claim 21 wherein the carrier is selected from the group consisting of a porous polymer, silica, titanium dioxide and carbon black.

23. The process of claim 14 wherein the acid anhydride is absorbed into the first polymer prior to grafting the acid anhydride to the first polymer.

24. A process of making a thermoplastic vulcanizate comprising:
   a. providing a first polymer in which is absorbed but not grafted thereto a carboxylic acid anhydride, the first polymer being selected from the group consisting of ethylene propylene copolymer, ethylene propylene diene terpolymer, butyl rubber, natural rubber, chlorinated polyethylene, silicone rubber, isoprene rubber, butadiene rubber, styrene-butadiene rubber, ethylene-vinyl acetate, ethylene butylacrylate, ethylene methacrylate, ethylene ethylacrylate, ethylene-α-olefin copolymers, linear low density polyethylene, ultra low density polyethylene, high density polyethylene and nitrile rubber;
   b. adding a second polymer to the first polymer to form a blend, said second polymer being selected from the group consisting of polypropylene, polyethylene, high density polyethylene, polystyrene, acrylonitrile butadiene styrene, styrene acrylonitrile, polymethylmethacrylate, thermoplastic polyesters, polyethylene terephthalate, polybutylene terephthalate and polycarbonate;
   c. contacting the first polymer with a free radical generator;
   d. heating the blend of step (b) to provide a molten blend comprising the first polymer and the second polymer, wherein the first polymer has grafted thereto the carboxylic acid anhydride;
   e. adding an aminosilane which is loaded on a carrier to the molten blend of step (d) to crosslink the first polymer to produce a thermoplastic vulcanizate possessing a crosslinked dispersed rubber phase comprising the first polymer and a continuous thermoplastic phase comprising the second polymer, a gel content of between 10 to 50 wt % and an elongation at break of greater than 400%.

25. The thermoplastic vulcanizate produced by the process of claim 24.

26. A thermoplastic vulcanizate produced by the process comprising:
   a. providing a blend comprising:
      (i) a first polymer having grafted thereto or copolymerized therein a carboxylic acid anhydride, wherein the first polymer is selected from the group consisting of ethylene propylene copolymer, ethylene propylene diene terpolymer, butyl rubber, natural rubber, chlorinated polyethylene, silicone rubber, isoprene rubber, butadiene rubber, styrene-butadiene rubber, ethylene-vinyl acetate, ethylene butylacrylate, ethylene methacrylate, ethylene ethylacrylate, ethylene-α-olefin copolymers, linear low density polyethylene, ultra low density polyethylene, high density polyethylene and nitrile rubber; and
      (ii) a second polymer selected from the group consisting of polypropylene, polyethylene, high density polyethylene, polystyrene, acrylonitrile butadiene styrene, styrene acrylonitrile, polymethylmethacrylate, thermoplastic polyesters, polyethylene terephthalate, polybutylene terephthalate and polycarbonate,
   b. reacting the blend of step (a) with an aminosilane; and
   c. crosslinking the product of step (b) to produce a thermoplastic vulcanizate possessing a crosslinked dispersed rubber phase comprising the first polymer and a continuous thermoplastic phase comprising the second polymer, a gel content of between 10 to 50 wt % and an elongation at break of greater than 400%.

27. The thermoplastic vulcanizate of claim 26 wherein the first polymer is grafted with the carboxylic acid anhydride in the presence of a free radical generator.

28. The thermoplastic vulcanizate of claim 26 wherein the first and second polymers are blended prior to the grafting of the carboxylic acid anhydride to the first polymer.

29. The thermoplastic vulcanizate of claim 26 wherein the first and second polymers are blended subsequent to the grafting of the carboxylic acid anhydride to the first polymer.

30. The thermoplastic vulcanizate of claim 26 wherein the first and second polymers are blended simultaneously to the grafting of the carboxylic acid anhydride to the first polymer.

31. The thermoplastic vulcanizate of claim 26 wherein the aminosilane is carried on a carrier.

32. The thermoplastic vulcanizate of claim 31 wherein the carrier is selected from the group consisting of a porous polymer, silica, titanium dioxide and carbon black.

* * * * *

UNITED STATES PATENT AND TRADEMARK OFFICE
CERTIFICATE OF CORRECTION

PATENT NO.    : 6,448,343 B1
DATED         : September 10, 2002
INVENTOR(S)   : Schombourg et al.

It is certified that error appears in the above-identified patent and that said Letters Patent is hereby corrected as shown below:

Column 7,
Lines 1-25, please delete two solid black sections and insert the following structures in its place:
--

Columns 11, and 12,
Examples 18-21, in the table, please delete two solid black sections and insert the following two structures in its place:
--

--

Signed and Sealed this

Seventh Day of January, 2003

JAMES E. ROGAN
*Director of the United States Patent and Trademark Office*